Sept. 21, 1965  G. EVANGELISTI ETAL  3,207,889
ANALOGUE PIPE NETWORK ANALYZER
Filed Sept. 19, 1961  6 Sheets-Sheet 3
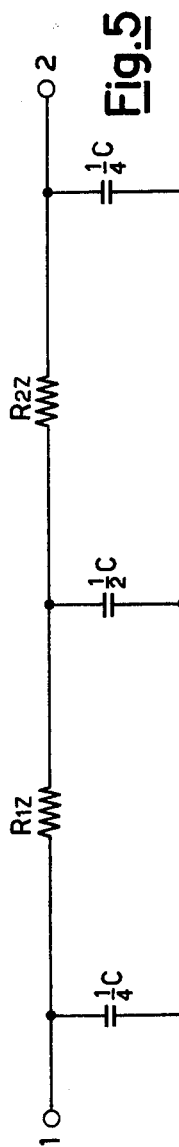
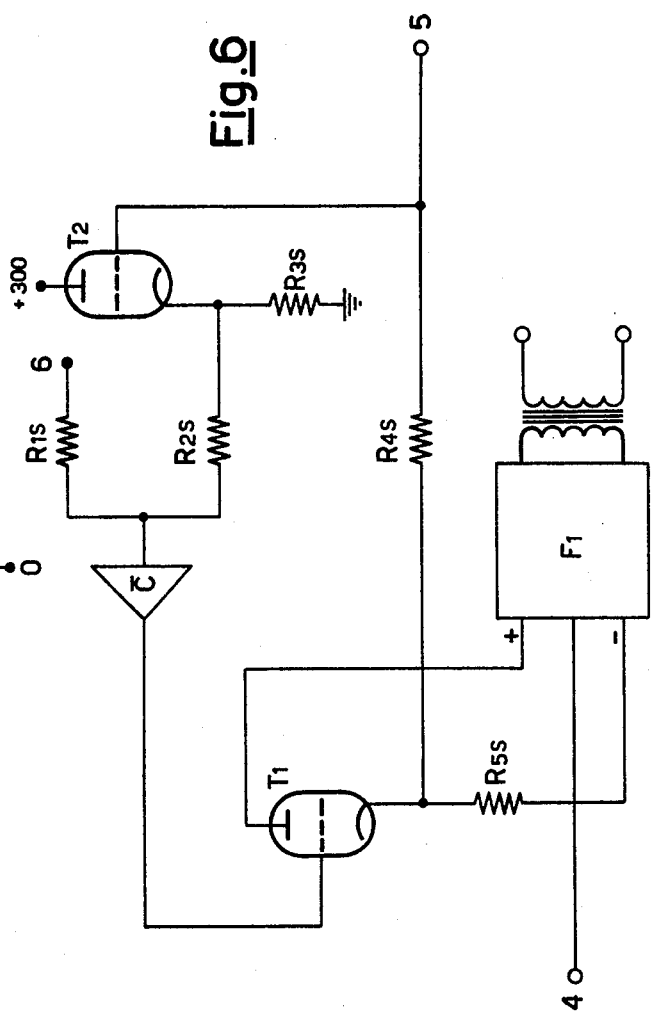
INVENTOR
GIUSEPPE EVANGELISTI
GIOVANNI MARRO
ENZO BELARDINELLI
EUGENIO SARTI
ALBERTO GRANDI
GIAMPAOLO BONFIGLIOLI
RINO RIGHETTI
BY
ATTORNEY

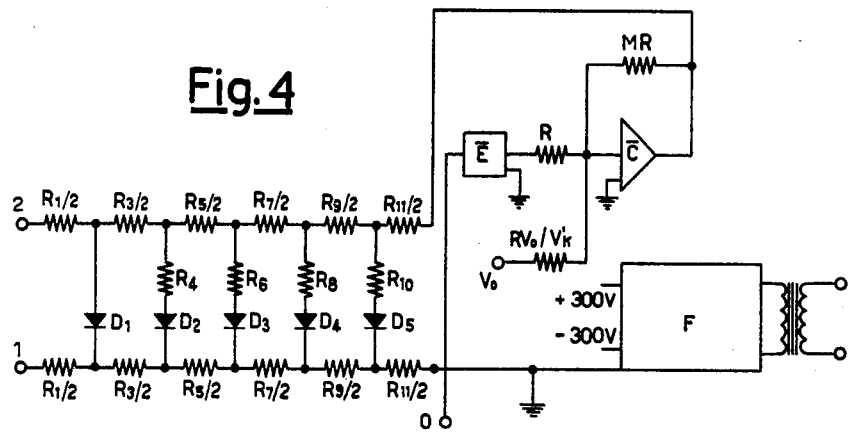
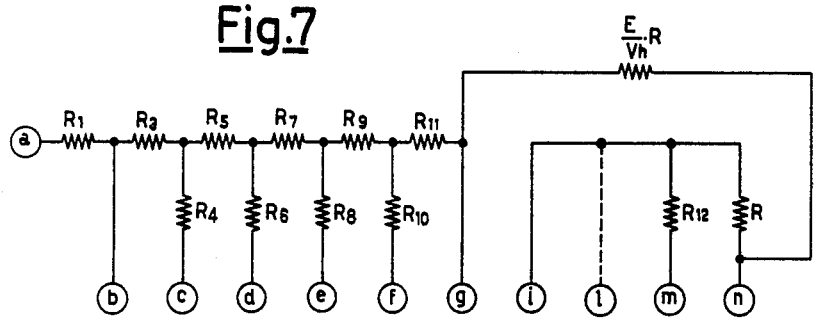

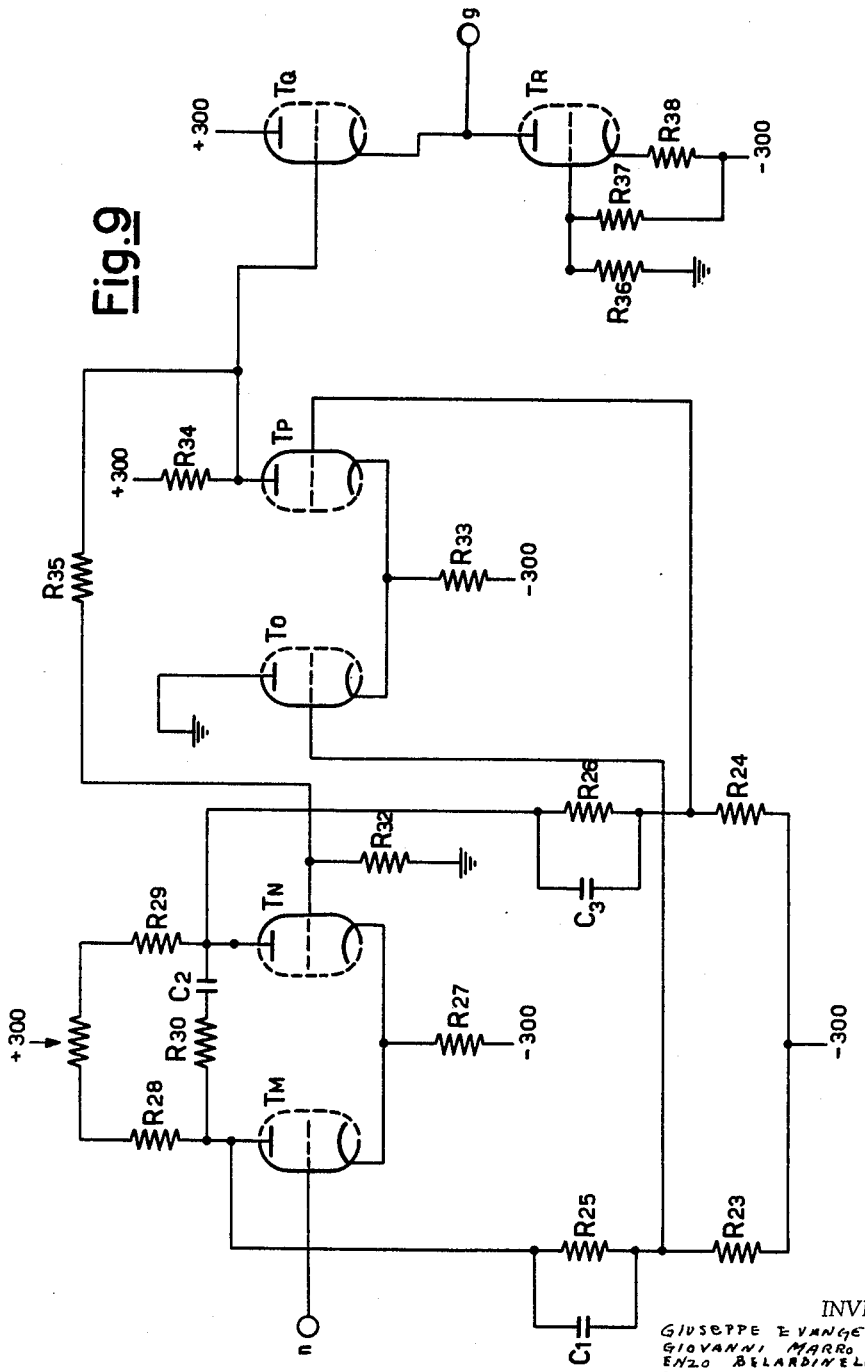

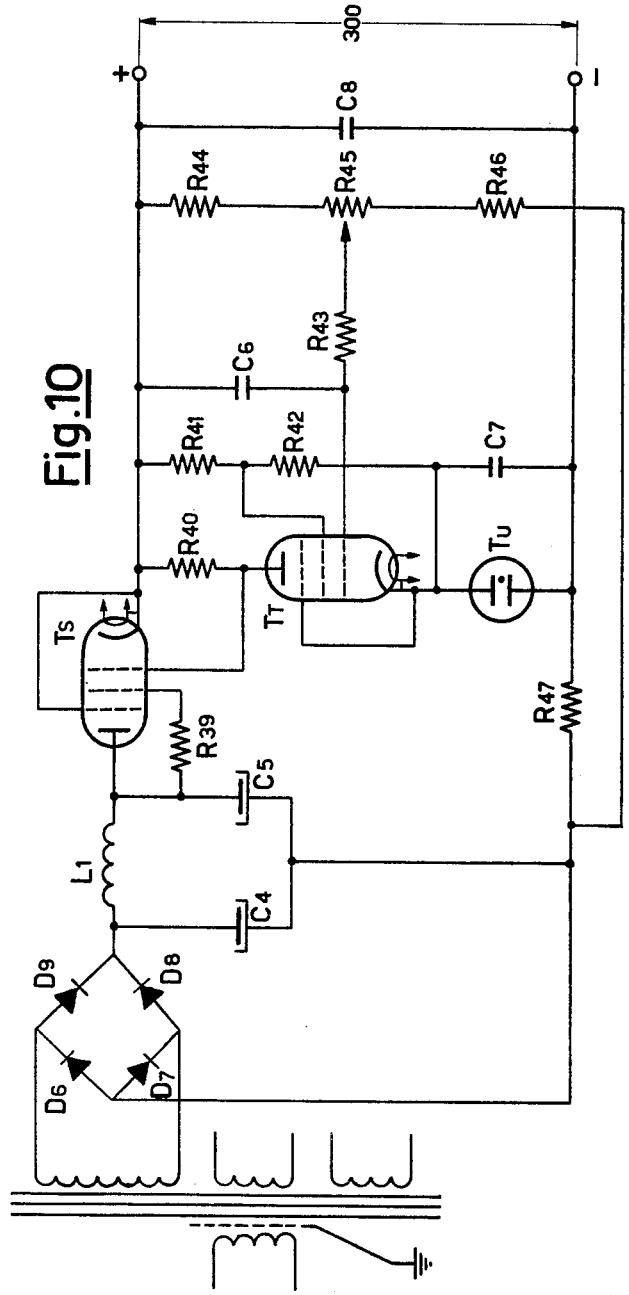

United States Patent Office 3,207,889
Patented Sept. 21, 1965

3,207,889
ANALOGUE PIPE NETWORK ANALYZER
Giuseppe Evangelisti, Giovanni Marro, Enzo Belardinelli, and Eugenio Sarti, Bologna, and Alberto Grandi, San Donato Milanese, Giampaolo Bonfiglioli, Milan, and Rino Righetti, San Donato Milanese, Italy, assignors to Societa Nazionale Metanodotti S.p.A., Milan, Italy, a company of Italy
Filed Sept. 19, 1961, Ser. No. 139,246
Claims priority, application Italy, Sept. 21, 1960, Patent 653,270
3 Claims. (Cl. 235—184)

This invention relates to an electric analogue circuit designed to simulate a pressure pipe network for the transport of fluids in the liquid or gaseous state, that is to say, an electrical analogue of the fluid circuit by means of which the operation of the pipe network can be studied and problems connected with the operation thereof may be solved electrically. The electrical analogue makes it possible to determine the fluid or hydraulic magnitudes at various points, such as nodal pressure values and rates of flow, as functions of variations in the conditions of inlet, discharge or adjustment of various parts of the fluid circuit.

Electrical circuits which simulate the operation of hydraulic networks are already known for example, an electrical analogue has already been constructed for a distribution network for a town's gas wherein the various elements of the electrical analogue are in the form of resistors which are adjusted by hand. Such an arrangement has proved to be extremely cumbersome in operation and it is not possible to obtain a desired result rapidly. Furthermore, it is not suitable for solving problems connected with the operation of the network under conditions in which some factors vary continuously because the electrical analogue is not automatic in operation, since it requires the intervention of an operator who has to adjust the resistors manually and reach the desired operating conditions by trial and error methods.

Another electrical analogue is also known in which non-linear resistive elements are constituted by specially made lamps having tungsten filaments (which have been called fluistors) and which have an approximately parabolic current/voltage characteristic. The accuracy of the results is low and considerable difficulties arise in practice since a large range of the special tungsten lamps must be made available, the lamps are quite delicate and consume a good deal of power. Furthermore this particular arrangement is not suitable for solving problems connected with high pressure gas distribution networks since the laws upon which it is based differ substantially from the laws governing the movement of gases in high pressure conduits.

One object of the present invention is to provide an electrical analogue for a pressure pipe network containing groups of non-linear resistive elements with fixed parameters suited to the simulation of a flow of compressible or incompressible fluids submitted to any pressure and law of movement, including unsteady flow phenomena in high pressure gases. These groups are constituted by a network of linear resistances, polarized diodes and operational amplifiers.

A further object is to provide an electrical analogue of a complete fluid circuit in which the behavior of the circuit under continuously varying conditions of operation may be studied without the need for any adjustment, apart from the setting up of the initial conditions.

A further object is to provide an electrical analogue of a complete fluid circuit which is suitable for the solution of problems relating to a high pressure gas distribution system.

Still another object is to provide an electrical analogue of a fluid circuit which enables measurements to be made at high precision irrespective of whether the fluid or fluids passing in the circuit are compressible or substantially incompressible.

The invention consists of an electrical analogue circuit to simulate the operative conditions of fluid networks comprising non-linear resistive elements having predetermined fixed characteristics energized by one or more function generating circuits.

According to the above mentioned feature of the invention each non-linear resistive element is constituted by a network of linear resistances and diodes, which may be biased.

In using the invention the degree of precision in measurement depends mainly upon the number of diodes used in the construction of the non-linear electric element and the precision can, within reason, be raised to any desired level depending upon the importance of the particular measurement to be made. The invention enables the determination of rates of flow, nodal pressures and other parameters of the network of conducts completely automatically, either under steady conditions or under transient conditions.

Example of the invention will now be describe, in a non-limiting sense, with reference to the accompanying drawings, in which:

FIGURE 4 illustrates a circuit which includes certain simplifications;

FIGURE 5 shows the sub-division of a group of diodes into two portions;

FIGURE 6 is a diagram of an electrical analogue of a common compression station; and FIGURES 7 to 10 constitute a complete operational diagram of an electrical analogue of a section of a fluid circuit of the type illustrated in the block diagram of FIGURE 3.

Figure 1:
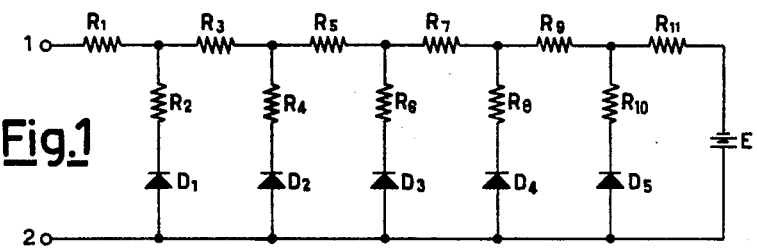
FIGURE 1 shows the circuit of one form of non-linear resistive element according to the invention.

It is known that the permanent movement of gases in a section of conduit contained between nodal points 1 and 2 is governed by the equation:

$$p_1^2 - p_2^2 = 2\gamma_1 p_1 \left\{ \lambda \frac{L}{D} + 2\xi \log_0 \frac{p_1}{p_2} \right\} \frac{w_1^2}{2g}$$

wherein:

$p_1$=absolute pressure at nodal point 1
$p_2$=absolute pressure at nodal point 2
$\gamma_1$=specific gravity at nodal point 1
$\lambda$=resistance number
$L$=length of the conduit section
$D$=diameter of conduit
$w_1$=gas velocity at nodal point 1
$g$=acceleration due to gravity
$\xi$=coefficient of the kinetic term The logarithmic term becomes appreciable only for fluid velocities much higher than those which normally occur in networks of conduits, hence it can generally be neglected, the resulting error being smaller than one percent.

The resistance number $\lambda$ in normal networks of conduits, in which the Reynolds number N is higher than 5,000, is expressed, in implicit manner, by the following relation:

$$\frac{1}{\sqrt{\lambda}} = -2 \log_{10}\left(\frac{2.51}{N\sqrt{\lambda}} + \frac{1}{3.72}\frac{\epsilon}{D}\right)$$

with
$N$=Reynolds number
$\epsilon$=roughness of the tube

One can assume, as an interpolar expression of the equation previously stated, the monomial formula:

$$\lambda = \frac{\lambda_0}{N_0^\beta} \cdot N^\beta = \frac{\lambda_0}{W_0^\beta} W^\beta$$

(where the subscript 0 furnishes values of the parameters in conditions assumed as conditions of reference) which makes it possible to obtain very close approximations, with an error of the order of only one percent, provided one works within the zone of tangency of the curves expressed by the two above equations.

Hence there remains definitely the following equation of the permanent movement of the gases in the conduits:

$$p_1^2 - p_2^2 = 2p_N \cdot K \cdot Q_N^{2+\beta}$$

which may also be written in the shape:

$$p_1 - p_2 = \frac{2p_N}{p_1 + p_2} K Q_N^\alpha \quad (1)$$

where:

$p_N$=reference pressure
$Q_N$=flow by volume in the state of the gas assumed as reference
$K$=constant $$\alpha = 2 + \beta$$

The Relation 1 is the general equation of the steady flow movement of compressible fluids.

The equivalent of the Relation 1 under the case of fluids non-compressible in practice and of those compressible in conditions of low pressure is expressed by the equation:

$$p_1 - p_2 = K Q^\alpha \quad (2)$$

To the equation of type 1 there corresponds one expressed in electrical parameters which, therefore, represents electrical phenomena analogous to hydraulic phenomena and following the same analytic law. This is:

$$V_1 - V_2 = \frac{2V_n}{V_1 + V_2} K I^\alpha = \frac{V_n}{V_m} K I^\alpha \quad (3)$$

wherein $V_1$ and $V_2$ are the potentials in points 1 and 2 of the electric analogue (corresponding to the extremes 1 and 2 of the section of conduit) related to the general mass; $V_m$ is their arithmetic average and $V_n$ is a constant having the form of a voltage.

On comparing Equation 3 with Equation 1 it is apprehended that the voltages correspond to the pressures at the nodal points and the current intensities to the fluid flow. An electric circuit arranged in such a manner as to follow the law of Equation 3 makes it possible to find the hydraulic magnitudes from the corresponding electrical magnitudes, whereby the object of the present invention is attained.

In FIGURE 1 there is illustrated a circuit, according to the present invention, which follows the law:

$$V_1 - V_2 = K I^\alpha \quad (4)$$

corresponding to Equation 2. This circuit, constituted by diodes $D_1, D_2, \ldots, D_5$ and by resistances $R_1, R_2, \ldots, R_{11}$, makes it possible to solve all problems relative to conduits transversed by compressible fluids at low pressures, or by substantially incompressible fluids.

It is easy to deduce how, by varying the E.M.F. of energization of said circuit from E to $h_E$, the Equation 4 becomes:

$$V_1 - V_2 = \frac{K}{h^{\alpha-1}} I^\alpha \quad (5)$$

From the Equations 3 and 5 is obtained the dependence of $h$ on $V_m$ namely:

$$h = \left(\frac{V_m}{V_n}\right)^{\frac{1}{\alpha-1}} \quad (6)$$

Figure 2:
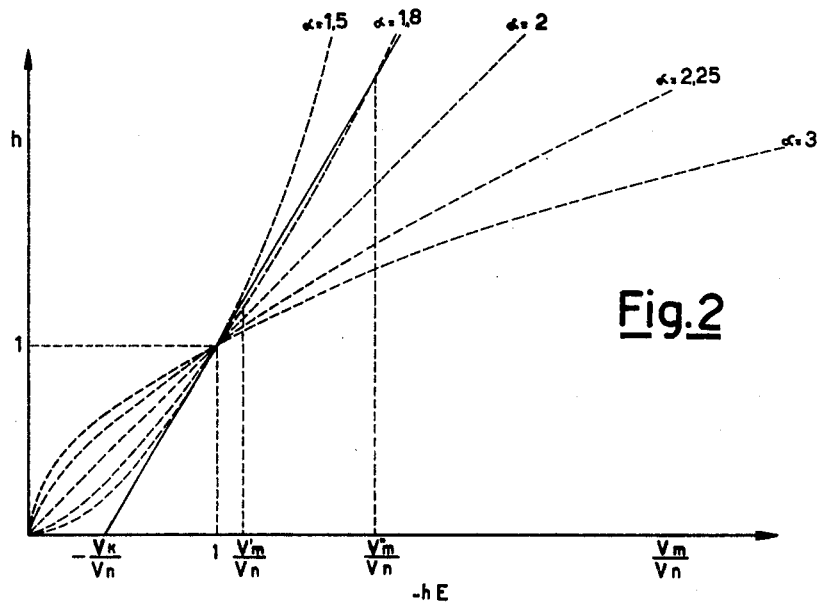
FIGURE 2 is a curve, to Cartesian co-ordinates, of the equation 6 herein for various values of $\alpha$.

In FIGURE 2 the Cartesian graph of Equation 6 is illustrated for various values of $\alpha$.

It is evident that the relation between $h$ and $V_m/V_n$ is represented in practice by generalized parabolas; for $\alpha=2$ a straight line graph is produced (that is to say, the relation between $h$ and $V_m/V_n$ is one of directed proportionality). A suitable function-generating circuit constituted by operational amplifiers, connected by means of a network of diodes, is able to furnish an energizing E.M.F. following the law of Equation 6 to the networks of diodes, as for instance represented in FIGURE 1.

It will be seen that it is possible to secure that at the ends of the network of FIGURE 1 the relationship between the voltages applied and the current that circulates is ruled by the Equation 3, to a high degree of precision.

Save in special cases, however, it generally suffices in practice to obtain a moderately accurate approximation in accordance with the law of Equation 3 and in such circumstances it is possible to make substantial simplifications in the circuit of the function generator.

It should be noted that parts of the generalized parabolas of the graphs of FIGURE 2, which represent the Equation 6, which cover the range of pressures etc., which are of interest, can be approximately represented by a straight line, that is to say, for $V_m \gg V_n$ and for $\alpha$ close to 2, without producing any considerable error. The error depends on the ratio between the two extreme values $V'_m$ and $V''_m$ which define the field of variability of the voltage $V_m$.

By means of $q=V''_m/V'_n$ and $\alpha$ it is possible to calculate the maximum percentage error, as shown in Table 1, based on the substitution of a part of the generalized parabola according to Equation 6 by a straight line between the points of abscissae $V'_m/V_n$ and $V''_m/V_n$.

Table 1, maximum percentage error

| | |
|---|---|
| 1% for $q=2$ | $\alpha=1.8$ |
| 2.1% for $q=3$ | $\alpha=1.8$ |
| 1.6% for $q=5$ | $\alpha=1.9$ |
| 0 for $q=$any value | $\alpha=2$ |

In practice a ratio $q=2$ suffices.

The equation of the straight line that interpolates the graph of Equation 6 between the points of abscissae $V'_m/V_n$ and $V''_m/V_n$ is:

$$h = \frac{V''_m{}^{\frac{1}{\alpha-1}} - V'_m{}^{\frac{1}{\alpha-1}}}{V_n^{\frac{1}{\alpha-1}}(V''_m - V'_m)} V_m + \frac{V'_m{}^{\frac{1}{\alpha-1}}V''_m - V''_m{}^{\frac{1}{\alpha-1}}V'_m}{V''_m - V'_m} = \frac{1}{V_h}(V_m + V_k) \quad (7)$$

where $V_h$ and $V_k$ are constants having the form of a voltage: $V_k$ *is* $>0$ or $<0$ according to whether $\alpha>2$ or $\alpha<2$.

A circuit that furnishes an E.M.F. of energization following the law #7, to a network of diodes as, for instance, is represented in FIGURE 1, therefore provides a dependence between the voltage applied and the current circulating at the ends of the network, within the cited range of error, in accordance with the Equation 3.

Figure 3:
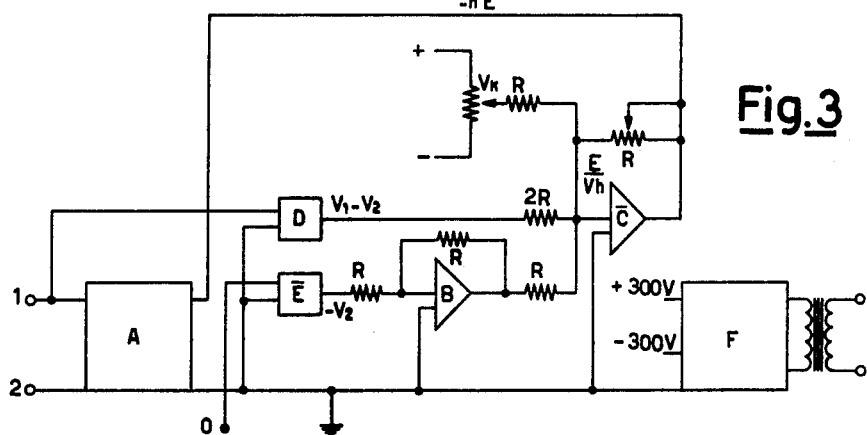
FIGURE 3 shows an electrical circuit which follows the law according to Equation 3 herein.

This circuit is represented in FIGURE 3; all of the voltages indicated in the figure are related to the parts of the circuit that are at the potential $V_2$ with respect to the general reference level 0 of the voltages applied.

In addition to the network of diodes A, this circuit comprises a function-generator constituted, in this case, by two amplifiers, B and C, and the network necessary to obtain the variable voltage of energization $hE$; normal D.C. amplifiers have been used without stabilization, of the "chopper" type, because the error (a few mv.) due to the drift effect is small as compared with the voltages in the circuit (which may amount to several tenths of volts). The amplifier B provides phase reversal of the voltage $-V_2$ which provides the general level of reference with respect to the level of the circuit, the amplifier $\overline{C}$ serves to add the voltages $V_2(V_1-V_2)/2$, and $V_k$ and to multiply the sum by the constant $E/V_h$: at the output thereof we shall have, therefore, the voltage:

$$-hE=\frac{E}{V_h}(V_m+V_k) \quad (8)$$

which, on the basis of Equation 7, serves to bias the diode network in such a manner as to comply with Equation 3.

The blocks D and $\overline{E}$ represent impedance changing devices and the block F represents the power supply.

By adopting a diode network with symmetrical resistances, a considerable simplification of the function-generator is obtained, as is clearly seen from FIGURE 4, relating to an analogue of a conduit which includes the above recited simplifications.

The function-generator, which provides an E.M.F. $hE$, expressed by the Equation 8, becomes reduced to one single amplifier $\overline{C}$ and to a cathode follower $\overline{E}$.

The difference of potential $$-\left(V_m-\frac{hE}{2}\right)$$

between the general level 0 with respect to the level of the element, is transmitted to the adding amplifier $\overline{C}$, together with the fixed voltage $-V_k$. At the output of $\overline{C}$, which has a gain, there will be obtained the voltage $$hE=-M\left(-V_m+\frac{hE}{2}-V_k\right)$$

From this latter expression it is possible to deduce the relation:

$$hE=\frac{2M}{2+M}(V_m+V_k)$$

which coincides with Equation 8 for $$V_h=\frac{2+M}{2M}\cdot E$$

As for the problems of variable or transient flow of compressible fluids (for incompressible fluids or for compressible fluids at low pressures the problem of transient flow has no practical counterpart), it is easy to verify that if the rates of compression and expansion of the gas are sufficiently slow—as happens as a rule in big transport networks—the inertia of the fluid remains negligible. The system is thus equivalent to a continuous system with only two parameters—capacity of accumulation and flow resistance—which is treated by the usual means of the concentration of the constants: the effective conduit is represented by the succession of $n$ discrete portions of the $\pi$ type each containing a hydraulic capacity devoid of resistance and a concentrated resistance. In that way the effective conduit is simulated by a chain of $n$ sections.

The parameters which characterize said chain are readily determined. The total resistance, obviously furnished by the Equation 1 is divided into $n$ parts having each the coefficient $K/n$ instead of $K$. As for the capacity parameter, if $$U=\frac{\pi}{4}D^2L \quad (9)$$

is the volume of a section of conduit, assuming as positive the flows taking place in the section, referred to the atmospheric pressure and the weight issued during the time $dt$ (which has the value $\gamma_N Q_N dt$) being equal to that lost by the section (which is $$-Ud\gamma=-U\frac{\gamma_N}{P_N}dp\Big)$$

there follows the equation $$-\frac{dp}{dt}=\frac{P_N}{U}Q_N \quad (10)$$

which shows that the parameter of capacity of the entire section is the constant $U/P_N$. This capacity then is to be divided among the $n$ portions in obvious manner. The Equation 10 has its electrical counterpart $$-\frac{dV}{d\tau}=\frac{1}{C}I \quad (11)$$

$\tau$ being the time of the analogue (which corresponds to the time $t$ of the original according to the ratio of scale adopted).

The number of groups $n$ determines the precision of the system equivalent to the section of conduit. Depending on the importance of the conduit and on the accuracy required, the number $n$ of cells can be selected.

For the requirements which arise normally in practical cases it suffices to adopt the subdivision of the section of conduit into 2 portions, according to the arrangement shown in FIGURE 5 (where $R_{1Z}$ and $R_{2Z}$ indicate the non-linear resistances obtained with the diode circuit and the terminal 0 is understood to represent the reference level of the circuit). With this representation with concentrated constants, every conduit is broken into two parts by an intermediate nodal point (in which it is possible to insert, in addition to its own capacity, also the possible outputs distributed along the path).

To complete the reproduction of the conduit network it is necessary to simulate also particular points, namely the point of inlet, the points of outlet, the pressure control points and the zones of reduced pressure.

The element containing the network of biased diodes according to the present invention can also serve for the simulation of the above named particular points but, thanks to the simplicity of the equations which govern the operation of said points, it is more convenient to resort to particular circuits, which will be described hereinafter.

The typical inlet in the network is characterized in that the flow is variable, depending on the absorption of the conduits connected thereto, keeping the pressure constant. In conformity with the analogy between hydraulic and electric magnitudes the electrical analogue of a point of admission is obtained by adopting a common source of E.M.F. with negligible internal resistance, as compared with the resistances of the analogues of the branches of conduits.

The outlet point is generally characterized in that there is absorption of a constant flow independent of the pressure and, therefore, it can be simulated by means of a constant current generator which, as is known, keeps the value of current constant independently of the voltage.

The compression station of most frequent type is characterized in that there is kept constant (by means of automatic regulators) the downstream pressure, independent of the upstream pressure or of the flow of the fluid.

In FIGURE 6 there is shown the arrangement of the analogue of a compression station of the type mentioned above.

The block $F_1$ represents the feeder with balanced output and the block $\overline{C}$ the high-gain amplifier, while the resistances $R_{1S}$, $R_{2S}$ . . . , $R_{5S}$ and the electronic tubes $T_1$ and $T_2$ constitute the connecting circuits.

To the terminal 6 there is applied a suitable reference voltage and the output voltage is kept constant, on the terminal 5, for any value of the input voltage at 4.

By resorting to other elementary circuits, which it is not believed necessary to describe, it is possible to provide analogues of any other type of network.

By the use of the invention circuits may be devised to operate under a wide range of conditions which simulate fluid conduit systems operating under an equally wide range of conditions, be said circuits employed individually or be they connected in a system. It is possible, for instance, to arrange the fundamental circuit in such a manner that, by means of suitable taps, it be possible easily to replace the groups of resistances of FIGURE 4, permitting said circuit to simulate different elements of conduit. Those skilled in the art will not find any difficulty in adapting said circuit to solve the problem with which they may be concerned. Hence the scope of the present invention is very wide, enabling it, by suitable variants known in the art, to be adapted to solve a wide range of the problems which are encountered in current practice.

In order better to illustrate the present invention, the following example is provided, which is not to be regarded as limiting the invention.

*Example*

FIGURES 7-8-9-10 show the complete diagram of operation of an electric analogue of a section of conduit of the type illustrated in the block diagram of FIGURE 3. In FIGURE 7 is shown a diagram of the network of resistances of the diode element, which can be produced in plug-in form, thereby making possible, by the replacement only of the network of resistances, possibly connected to condensers for the simulation of the transients, the utilization of the element for the simulation of sections of conduits having different geometrical characteristics, and traversed by fluids having different physical characteristics.

Figure 8:
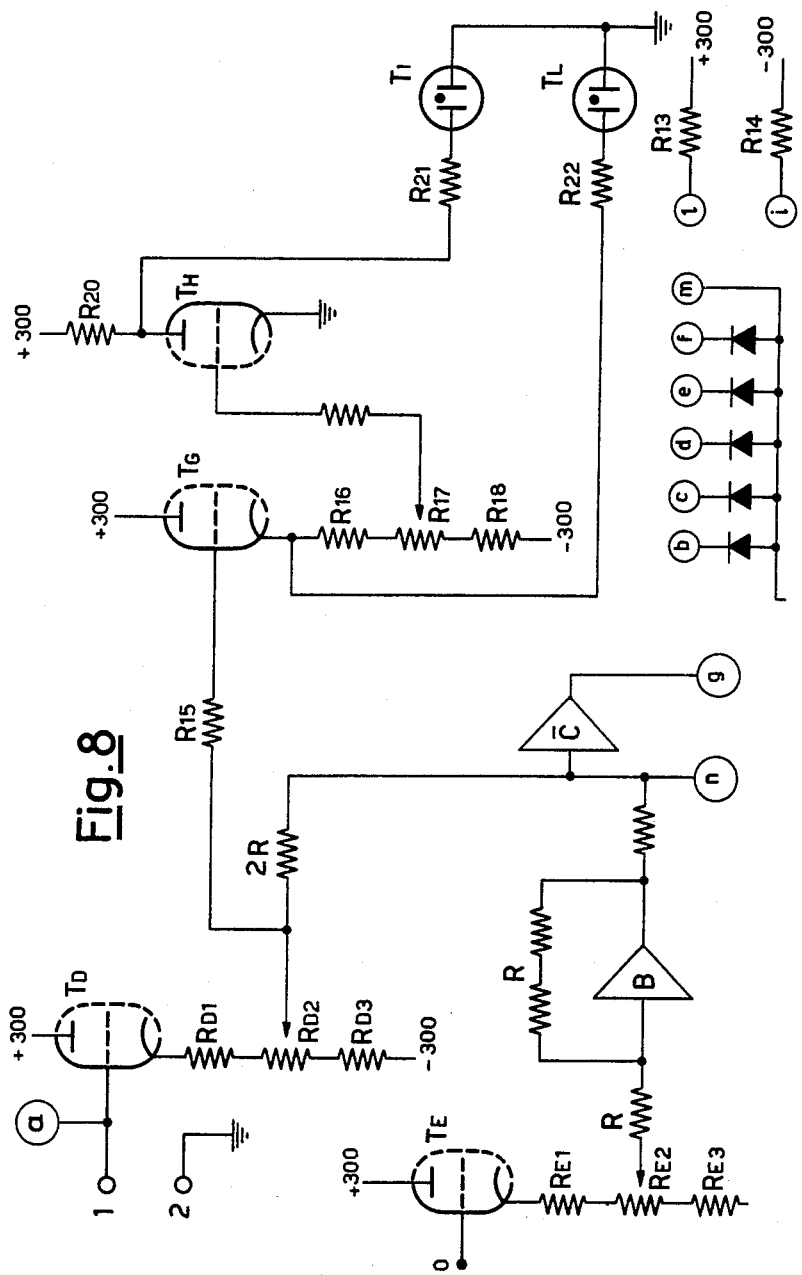

FIGURE 8 shows the network of diodes, the connections of the amplifiers $\overline{C}$ and B, the cathode followers D and E and the pilot circuit for the indicating lamps for the direction of biasing of the conduit element and said lamps $T_I$ and $T_L$. In FIGURE 9 there is represented the circuit of the operational amplifier $\overline{C}$ which, distinct from the amplifier B, presents in lieu of the cathode resistance of the cathode follower output the electronic tube $T_R$.

To complete the diagram, in FIGURE 10, is shown one of the two stabilized suppliers which have the duty of energizing all of the components of the analogue circuit. By arranging in series two elements of the type of FIGURES 7-8-9-10 and connecting the three ends to the general circuit through condensers of suitable capacity, the analogue is adapted to simulate the transient movement of the fluid in the conduit.

The diagrams above described have merely exemplifying value, since the arrangement of the electrical analogue of a conduit may have embodiments other than those described, though lying within the scope of the invention as set forth in the appended claims. It is possible, for instance, to replace the electronic tube by transistors in the whole circuit or part thereof, or to vary the logical arrangement of the amplifiers in such a way as to modify the equation that approximates the law 6 of the net work of diodes.

We claim:
1. An analogue pipe network analyzer simulating the running condition of a pipe-line network for fluids under pressure, comprising two electric terminals, a first chain of resistors connected in series to one of said terminals, a second chain comprising a like number of resistors connected to the other terminal, the resistors in one chain being equal, respectively, in resistance to the correspondingly-arranged resistors of the other chain, a resistor in series with a diode connected between the junctures of each of a plurality of pairs of adjacent resistors of one chain and the junctures of corresponding pairs of adjacent resistors of the other chain, and a variable E.M.F. generator comprising a power supply connected to one of the chains to polarize the resistors of both chains and establish a functional relationship between voltages and inlet current according to the equation:

$$V_1 - V_2 = \frac{V_n}{V_m} K I^\alpha$$

wherein $V_1$ and $V_2$ are the potentials at the two terminals, respectively, $V_m$ is their arithmetic average $$\left(V_m = \frac{V_1 + V_2}{2}\right)$$

$V_n$ is a constant having the form of a voltage, K is also a constant, I is the current measured in amperes, and $\alpha$ is variable, and a grounded amplifier connected to the other chain and to a further terminal, and a ground connected to one chain between the power supply and the terminal of that chain.

2. An analogue pipe network as claimed in claim 1, wherein a diode is connected between the juncture of the first and second resistors counting from said one terminal and the juncture of the first and second resistors counting from said other terminal, and a resistor in series with a diode connects each of the junctures of the other pairs of adjacent resistors of said first chain with each of the junctures of the corresponding other pairs of resistors of said second chain.

3. An analogue pipe network as claimed in claim 1, wherein the E.M.F. generators is adjustable to vary the value of $\alpha$ in proximity to 2.

References Cited by the Examiner
UNITED STATES PATENTS

| | | | |
|---|---|---|---|
| 2,509,042 | 5/50 | McIlroy | 235—185 |
| 2,556,200 | 6/51 | Lesti | 307—88.5 |
| 2,697,201 | 12/54 | Harder | 235—197 X |
| 2,831,107 | 4/58 | Raymond | 235—197 |
| 2,895,046 | 7/59 | Martin | 328—142 |

OTHER REFERENCES

Pages 857–861, 1/54, Stephenson, "The Use of Electric Network Analyzers for Pipe Network Analysis," Communications and Electronics, vol. 10.

MALCOLM A. MORRISON, *Primary Examiner.*

JOHN W. HUCKERT, *Examiner.*